United States Patent [19]

Farrar et al.

[11] Patent Number: 4,950,748

[45] Date of Patent: Aug. 21, 1990

[54] POLYSACCHARIDES

[75] Inventors: David Farrar; Peter Flesher; Kenneth Symes, all of West Yorkshire, England

[73] Assignee: Allied Colloids Ltd., United Kingdom

[21] Appl. No.: 173,947

[22] Filed: Mar. 28, 1988

Related U.S. Application Data

[60] Continuation-in-part of Ser. No. 111,148, Oct. 20, 1987, abandoned, which is a continuation of Ser. No. 796,158, Nov. 8, 1985, abandoned, which is a division of Ser. No. 609,681, May 14, 1984, Pat. No. 4,571,422, which is a continuation-in-part of Ser. No. 522,591, Nov. 16, 1983, abandoned.

[30] Foreign Application Priority Data

| May 17, 1983 | [GB] | United Kingdom | 8313521 |
| Sep. 23, 1983 | [GB] | United Kingdom | 8325503 |
| Mar. 26, 1987 | [GB] | United Kingdom | 8707251 |

[51] Int. Cl.$^5$ .................... C07H 1/00; C07G 17/001
[52] U.S. Cl. ...................................... 536/124; 536/114
[58] Field of Search ............................... 536/124, 114

[56] References Cited

U.S. PATENT DOCUMENTS

| 4,029,616 | 6/1977 | Nakashio et al. | 526/910 |
| 4,571,422 | 2/1986 | Symes et al. | 536/114 |
| 4,690,996 | 9/1987 | Shih et al. | 527/314 |

FOREIGN PATENT DOCUMENTS

| 0216091 | 4/1987 | European Pat. Off. . |
| 2259872 | 8/1975 | France . |
| 86/00315 | 1/1986 | PCT Int'l Appl. . |

OTHER PUBLICATIONS

Patent Abstracts of Japan, vol. 9, No. 1 (C-259) [1724], 5th Jan. 1985; & JP-A-59 155414 (Kogyo Gijutsuin), 04-09-1984.

*Primary Examiner*—Ronald W. Griffin
*Assistant Examiner*—Pamela S. Webber
*Attorney, Agent, or Firm*—Ostrolenk, Faber, Gerb & Soffen

[57] ABSTRACT

An intimate water soluble or water swellable blend of microbial polysaccharide and synthetic polymer derived from water soluble monomer or monomer blend is made by forming an emulsion in non-aqueous liquid of an aqueous fermentation solution of the microbial polysaccharide and the monomer or monomer blend and then polymerizing the monomer or monomer blend to form a dispersion in non-aqueous liquid of aqueous particles of the water soluble or water swellable blend. This dispersion may then be dehydrated.

10 Claims, No Drawings

POLYSACCHARIDES

This application is a continuation-in-part of application Ser. No. 111,148 filed Oct. 20, 1987, now abandoned, which was a continuation of Ser. No. 796,158 of Nov. 8, 1985, now abandoned, which was a division of application Ser. No. 609,681 of May 14, 1984, now U.S. Pat. No. 4,571,422, which was a continuation-in-part of application Ser. No. 522,591, filed Nov. 16, 1983, now abandoned.

Certain polysaccharides can be made by fermentation and are known as microbial polysaccharides. The fermentation is conducted in an aqueous fermentation broth which normally has a relatively low concentration, typically up to about 2% by weight, of polysaccharide at the end of the fermentation. Since it is inconvenient to transport and handle such dilute solutions it is normally preferred to convert the polysaccharide to a powder by evaporation of the water.

Because the initial broth has very low polysaccharide concentration the conversion of the polymer to a powder involves evaporation of a large amount of water and thus the use of a large amount of energy. Also the drying of microbial polysaccharides has to be conducted carefully so as to avoid "hornification", which results in the polysaccharide being rendered wholly or partially insoluble. Hornification tends to follow from exposing the polysaccharide to hot surfaces, such as the surfaces that are necessarily involved when drying a bulk solution. A process that is designed to avoid this is described in EP No. 128661 and this process does give greatly improved product quality. Direct exposure of the polysaccharide solution to hot surfaces is avoided or minimized as a result of dehydrating the solution while emulsified in a non-aqueous liquid.

It is well known that there are many circumstances in which it is desirable to provide an intimate water soluble or water swellable blend of a microbial polysaccharide and a synthetic polymer.

This blend can be merely a physical blend of the polysaccharide and the synthetic polymer. For instance synergistic thickening is reported for a poly-(acrylamidomethane sulphonic acid) and certain polysaccharide gums in U.S. Pat. No. 4,540,510. Similarly, U.S. Pat. No. 4,610,311 discloses a method of reducing aerial drift by using a mixture of xanthan and anionic polyacrylamide (supplied as a suspension of the powder polymers in oil thickened with organophilic clay) dissolved, in the aqueous solution being sprayed.

Alternatively the intimate blend can involve some or all of the synthetic polymer being graft copolymerised on to the polysaccharide. For instance xanthan polyacrylamide graft copolymers are described for controlling subterranean formation permeability in U.S. Pat. No. 3,844,348 and Deshmukh et al (J. Appl. Polym. Sci 32 (8) 1986 6163–76) say xanthan-polyacrylamide grafts have higher resistance to shear degradation and biodeterioration than xanthan alone when used as drag reduction aids. Graft copolymers of xanthan with acrylamido methane sulphonic acid monomer are described in GB No. 1,517,492.

Physical mixing of predried xanthan polymer with predried synthetic polymer produces a product that can undergo separation during storage and transport and so is unsatisfactory. A stable intimate blend of polymer and polysaccharide is made in EP No. 0188489 by conducting an exothermic gel polymerization of polymerisable monomer as a mixture with insoluble polysaccharide, which is gelatinised and rendered soluble during the polymerization by the exotherm. However this method cannot be used for microbial polysaccharides since they are initially soluble and exposure to high temperatures damages them and is liable to render them insoluble.

Copolymerisation of a relatively concentrated aqueous solution of acrylamido methyl dextrin and polymerisable monomer, while dispersed in a non-aqueous phase, is described in EP No. 0177296 but this is inappropriate for forming an intimate blend of a microbial polysaccharide as the method necessitates that a derivative of the microbial polysaccharide shall have been formed initially and it requires the use of a relatively concentrated solution of the polysaccharide.

In practice therefore intimate blends of microbial polysaccharide and synthetic polymer are generally made by mixing or reacting the polysaccharide whilst present as a very dilute solution, typically below 5%. When, as is typically required, the weight ratio polysaccharide:polymer is of the order of 1:1 this means that the total water content of the blend is very high and so the process is inconvenient to operate and large amounts of energy have to be used if the product is to be converted into a more convenient form.

In the invention an intimate water soluble or water swellable blend of microbial polysaccharide and synthetic polymer derived from water soluble monomer or monomer blend is formed by a process comprising forming an emulsion in non-aqueous liquid of an aqueous fermentation solution of the microbial polysaccharide and the monomer or monomer blend and then polymerising the monomer or monomer blend. The product is a dispersion in the non-aqueous liquid of aqueous particles of the water soluble or water swellable blend and preferably this dispersion is dehydrated to remove some or all of the water in the particles.

The aqueous fermentation solution is a solution of polysaccharide that has remainded in solution since its initial formation by fermentation. Thus the polysaccharide will not have been converted to a solid, dry, form prior to the process of the invention. The fermentation solution is normally a solution obtained by purifying a fermentation broth. The purification is generally conducted to remove cellular debris and also to remove any low amounts of dissolved, non-polysaccharide, components that are present during the fermentation, e.g., nutrients. The solution may have been subjected to a preliminary concentration step, e.g., during the purification process. Thus although the solution that is used as the starting material in the invention can have a very low polysaccharide concentration, e.g., 2% or lower, it is preferred that it has a polysaccharide content of at least about 6% and generally below about 20%, typically 7 to 12%.

The fermentation broth can have been made by fermentation in an aqueous phase dispersed in oil, followed by separation of the aqueous phase from the oil, but generally is made by fermentation in a bulk aqueous medium in known manner.

The microbial polysaccharide can be any polysaccharide that can be made by fermentation but is generally a xanthan, pseudemonas, arthrobacter or scleroglucan gum.

The emulsion can be formed by blending an emulsion of aqueous monomer with an emulsion of the aqueous fermentation solution but is preferably made by blending the monomer (accompanied by as little water as possible) with the aqueous fermentation solution since this minimizes the total amount of water in the final emulsion. When the monomer is supplied as an aqueous solution, its concentration in that solution is preferably at least 30% and generally at least 40% by weight.

The method can be performed by blending the monomer in the solution and then emulsifying the resultant solution into the non-aqueous liquid. Suitable dispersion promoters, for instance surfactants or stabilisers, and materials and methods are described in EP No. 128661. However the methods must be conducted in such a way as to avoid premature polymerization of the monomer or monomer blend and so in this method it is generally necessary to avoid exposing the aqueous solution to elevated temperatures during the emulsification.

It is therefore often preferred to make the emulsion by emulsifying the aqueous fermentation solution into the non-aqueous liquid using any of the techniques and materials described in EP No. 128661, especially techniques involving the use of elevated temperatures during the emulsification, followed by addition of relatively concentrated aqueous monomer to the emulsion, accompanied by sufficient stirring to distribute it throughout the aqueous phase. The monomer can be added after partial drying of the emulsion by azeotropic distillation.

The dry weight ratio of microbial polysaccharide to monomer will be selected having regard to the desired end product but is typically in the range 20:1 to 1:20, most preferably 3:1 to 1:3.

The monomer or monomer blend can be any water soluble monomer or monomer blend capable of being polymerised in aqueous solution in the presence of the polysaccharide. The or each monomer is usually an ethylenically unsaturated monomer. The monomers can be selected from non-ionic, anionic and cationic monomers. A typical non-ionic monomer is (meth) acrylamide and the preferred products are made from this alone or as a blend of, e.g., 10-90% other monomer. Typical anionic monomers are carboxylic or sulphonic monomers such as (meth) acrylic acid, allyl sulphonate or 2-acrylamido methane sulphonic acid. Anionic monomers are often used in the form of sodium or other water soluble salts. Typical cationic monomers can be dialkyl amino alkyl (meth) acrylamides and dialkyl amino alkyl (meth) acrylates, generally as acid addition or quaternary ammonium salts. Blends of monomers can be used. Typically blends are formed of acrylamide with an anionic monomer or of acrylamide with a cationic monomer.

The emulsion will include additives necessary for causing the desired polymerization, such as graft polymerisation initiators, homo- or co-polymerisation initiators, or molecular weight regulators.

If, as is often the case, it is desired that the final product should be water soluble then it is normally preferred to conduct the polymerization under conditions such that there is little or no grafting of the synthetic polymer on to the polysaccharide. Initiators for avoiding grafting during copolymerisation are described in EP No. 0188489. However when it is desired that some or all of the synthetic polymer should be graft polymerised on to the polysaccharide then it may be necessary to include grafting initiators, such as those discussed in EP No. 0188489. The graft polymers can be water swellable, rather than water soluble. Instead of or in addition to grafting, the products may be rendered water swellable by cross linking of the synthetic polymer in known manner, for instance by use of a diethylenically unsaturated monomer of the type known for cross linking acrylic monomers.

The invention has the great advantage of starting with the conventional relatively dilute aqueous fermentation solution and, in a ,single stage, converting this into an easily handleable product that has a much higher solids concentration and that is a blend of the polysaccharide and the synthetic polymer. Additionally, this product is in a form such that it can then easily be dried further. Accordingly the invention avoids the difficulties of the prior art, namely handling and utilising very dilute solutions and/or the use of large amounts of drying energy. Additionally, the process has the great advantage of being able to convert the microbial polysaccharide to a high-solids form, with polymer, without having to apply so much drying energy to it. This reduces the risk of damage to the performance properties of the polysaccharide. In fact, the product of the process has properties that are better than would be expected. For instance the product can dissolve rapidly to form a very good viscosifying solution, e.g., for downhole use, for instance in dilute saline brine.

The dehydration can be conducted merely to increase the concentration of the blend in the particles, e.g., above 50% dry weight by weight of aqueous particle, but preferably the dehydration is conducted to form a substantially dry product that can be a dispersion of dry blend particles in the non-aqueous liquid or can be provided as a powder. The dehydration can be by any convenient method but is generally by the spray drying method described in EP No. 180366 or, preferably, the azeotropic distillation method described in EP No. 128661.

The following are some examples.

EXAMPLE 1

A 50% w/w solution of acrylamide in water (152 parts) was mixed with 0.2 parts thermal initiator. This solution was then thoroughly mixed with a xanthan concentrate (Shellflo XA, supplied by Shell Chemical Co.Ltd.) (1000 parts).

The resulting viscous aqueous broth pH 6 was emulsified into an oil phase consisting of the following chemicals (as described in EP No. 128661):

| Tween 81 (surfactant) | 8 parts |
|---|---|
| 2:1 molar copolymer of cetostearyl methacrylate and methacrylic acid; 30% in SBP11 (stabiliser) | 40 parts |
| Shell pale oil 60 (non-volatile oil) | 80 parts |
| SBP11 (Volatile oil, Shell) | 850 parts |

After the emulsion had been formed at 20°-30° C., heating was applied with continued vigorous agitation to a final temperature of 80° C. This temperature was held for 15 minutes with external cooling necessary to prevent a temperature rise (presumably caused by the exothermic polymerisation of acrylamide).

The cooled emulsion was transferred to a reaction vessel, then de-gassed by passing $N_2$ through the mixture for 1 hour and residual monomer polymerised by addition of redox initiators (1.5 milliliter tert-butyl hydroperoxide 0.1% in SBP11, 1 ml 0.5% aqueous sodium metabisulphite).

After stirring for 1 hour, the $N_2$ bubbler was removed and the volatile components (water plus SBP11) removed by distillation under vacuum (14 mm Hg) to a maximum temperature of 95° C.

The product was a smooth, pourable 58% polymer dispersion (1:1 xanthan:polyacrylamide) which hydrated readily when added to water to give viscous solutions at 1%. Polarographic analysis showed that 95% of the acrylamide had been converted to polymer.

EXAMPLE 2

In a similar procedure to that given in Example 1, 308 parts 50% acrylamide was mixed with 1000 parts Shellflo XA and the mixture emulsified and polymerised as before. This time an exothermic reaction took place raising the temperature by 12° C. on addition of the redox initiators. Distillation as before gave a 55% polymer dispersion (1:2 xanthan:polyacrylamide).

EXAMPLE 3

This example demonstrates an alternative procedure which avoids heating the aqueous monomer.

Xanthan concentrate (1000 parts; Shellflo XA) was emulsified into the following oil phase;

| surfactant | (as Example 1) | 8 parts |
|---|---|---|
| stabiliser | " | 41 parts |
| Pale Oil 60 | " | 80 parts |
| volatile solvent | " | 472 parts |

This emulsion was heated to 80° C. during emulsification to give a fine droplet size of xanthan solution in oil. This mixture was then cooled, and under vigorous agitation 50% aqueous acrylamide was added (152 parts) with continued cooling to ensure that the temperature did not exceed 25° C.

After 10 minutes agitation, the mixture was transferred to a reaction vessel and polymerised as before by addition of tert-butyl hydroperoxide (1.2 ml, 0.1% in water). An exotherm of 5° C. was observed over 56 minutes.

Distillation under vacuum with an extra 784 parts volatile oil gave a 55% polymer dispersion (1:1 xanthan:polyacrylamide).

EXAMPLE 4

Example 3 was repeated except that the aqueous monomer consisted of a mixture of acrylamide (55 parts) and sodium acrylate (23 parts) in water (88 parts) adjusted to pH 7.0 with concentrated hydrochloric acid.

After the double emulsification procedure, polymerization and distillation gave a 53% solids polymer dispersion of a 1:1 copolymer of xanthan with 70:30 poly(acrylamide-sodium acrylate).

EXAMPLE 5

A combination emulsion was prepared as described in Example 4 except that 0.18 part ammonium persulphate was added to the aqueous monomer phase. Polymerisation was effected by degassing and holding the mixed emulsion at 60° C. for 3 hours.

Volatiles were removed from the cooled mixture after dilution with 784 parts volatile oil and azeotropic distillation as before.

We claim:

1. A process of forming an intimate water soluble or water swellable blend of microbial polysaccharide derived from an aqueous fermentation solution containing up to 20% by weight microbial polysaccharide and synthetic polymer derived from water soluble ethylenically unsaturated monomer or monomer blend, the process comprising forming an emulsion in non-aqueous liquid of the aqueous fermentation solution of the microbial polysaccharide and the monomer or monomer blend, polymerizing the monomer or monomer blend to form a dispersion in the non-aqueous liquid of aqueous particles of the water soluble or water swellable blend, and then dehydrating the dispersion to increase the concentration of the blend in the particles to above 50% dry weight based on the weight of the aqueous particles.

2. A process according to claim 1 in which the aqueous fermentation solution contains 6 to 20% by weight microbial polysaccharide.

3. A process according to claim 1 in which the emulsion is formed by blending the monomer or monomer blend with the aqueous fermentation solution and then emulsifying the resultant solution into the non-aqueous liquid.

4. A process according to claim 1 in which the dispersion in non-aqueous liquid of aqueous particles is dehydrated to form a dispersion of substantially dry particles in the non-aqueous liquid.

5. A process according to claim 1 in which the dispersion in non-aqueous liquid of aqueous particles of the water soluble or water swellable blend is dehydrated by azeotropic distillation.

6. A process according to claim 1 in which the dry weight ratio microbial polysaccharide to monomer or monomer blend is from 3:1 to 1:3.

7. A process according to claim 1 in which the water soluble monomer blend comprises acrylamide.

8. A process according to claim 1 in which the microbial polysaccharide is selected from a xanthan, pseudemona, arthrobacta or scleroglucan gum.

9. A process according to claim 1 in which the final product is water soluble and polymerization is conducted under conditions that substantially prevent graft polymerization.

10. A process according to claim 8 in which the water soluble monomer blend comprises acrylamide, the dry weight ratio of microbial polysaccharide to monomer blend is from 3:1 to 1:3 and in which the aqueous fermentations solution contains 6 to 20% by weight microbial polysaccharide.

* * * * *